United States Patent [19]

Wild

[11] 4,202,606
[45] May 13, 1980

[54] LIQUID CRYSTAL DISPLAY HAVING INTEGRATED BRIDGE CONTACTS

[75] Inventor: Peter Wild, Wettingen, Switzerland

[73] Assignee: BBC Brown Boveri & Company Limited, Baden, Switzerland

[21] Appl. No.: 851,779

[22] Filed: Nov. 15, 1977

[30] Foreign Application Priority Data

Dec. 9, 1976 [CH] Switzerland ............... 15488/76

[51] Int. Cl.² .............................................. G02F 1/13
[52] U.S. Cl. .................................. 350/336; 350/334; 350/343
[58] Field of Search ............... 350/334, 336, 343, 344

[56] References Cited

U.S. PATENT DOCUMENTS

| | | | |
|---|---|---|---|
| 3,853,392 | 12/1974 | Fergason | 350/344 X |
| 3,902,790 | 9/1975 | Hsih et al. | 350/334 |
| 3,936,930 | 2/1976 | Stern | 350/334 X |
| 4,132,984 | 1/1979 | Gross | 350/334 X |

FOREIGN PATENT DOCUMENTS 2610593 9/1977 Fed. Rep. of Germany.

*Primary Examiner*—Edward S. Bauer
*Attorney, Agent, or Firm*—Oblon, Fisher, Spivak, McClelland & Maier

[57] ABSTRACT

An improved liquid crystal display having two glass plates separated by a cell sealing bar. Bridge contacts are provided between selected exterior electrode contacts on one of the glass plates and the common electrode of the second glass plate. These bridge contacts are made by employing a cell sealing bar with a predetermined controlled conductivity, thereby integrating the bridge contact into the display structure.

4 Claims, 4 Drawing Figures

LIQUID CRYSTAL DISPLAY HAVING INTEGRATED BRIDGE CONTACTS

BACKGROUND OF THE INVENTION

1. Field of the Invention:

The invention relates to liquid crystal displays having bridge contacts provided between unused electrode connections and the electrode hereinafter called the "common electrode". These bridge contacts are employed in order to prevent unused characters from being partially operated and thereby rendered visible as a consequence of lateral residual conductivities between electrode segments.

2. Description of the Prior Art:

In liquid crystal displays, especially those for wrist watches, the manufacturer's aim is to meet various customer requirements with one only display. Examples of special characters which are requested in addition to the numerical characters are:

indicators in letters: DATE, SEC, MONTH, LAP, STOP, ALARM, AM, PM.
alarm and chronograph symbols.
minute and second characters.
additional segments in 7-segment digits for representing letters.

If various indicators of the above-described type are provided on a display which is as comprehensive as possible, the module producer at present must connect the unused connections to the connection for the "common" electrode. Only in this way is it possible to ensure that unused characters are not partially operated and thus rendered visible as a consequence of lateral residual conductivities.

In general, electrical connections between unused connections and the connection for the common electrode require bridge contacts, that is to say electrical connections between at least two electrode paths in the same plane which are generally separated from one another by other electrode paths in the same plane, the one electrode path being contacted through to the common electrode. In the conventional solutions these connections are effected either on electronic substrates with a plurality of conductor path planes or by means of supplementary "wire-bound" bridges outside the display. These solutions entail high costs for module manufacture and problems connected with surface layouts. It is characteristic of present technology that the required bridge contacts are not constructed in the display itself.

SUMMARY OF THE INVENTION

Accordingly, one object of this invention is to provide a novel low cost liquid crystal display.

Another object of this invention is to provide a novel liquid crystal display capable of displaying a multiplicity of alphanumeric characters.

Yet another object is to provide a novel liquid crystal display which is capable of displaying a multiplicity of alphanumeric characters and which is characterized by simple conductor layouts on the surface of the electrode planes.

A further object of this invention is to provide a novel liquid crystal display having improved means for connecting unused conductors to a common electrode.

These and other objects of the present invention are achieved by providing an improved liquid crystal display having two glass plates separated by a cell sealing bar. Bridge contacts are provided between selected exterior electrode contacts on one of the glass plates and the common electrode of the second glass plate. These bridge contacts are made by employing a cell sealing bar with a predetermined controlled conductivity, thereby integrating the bridge contact into the display structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
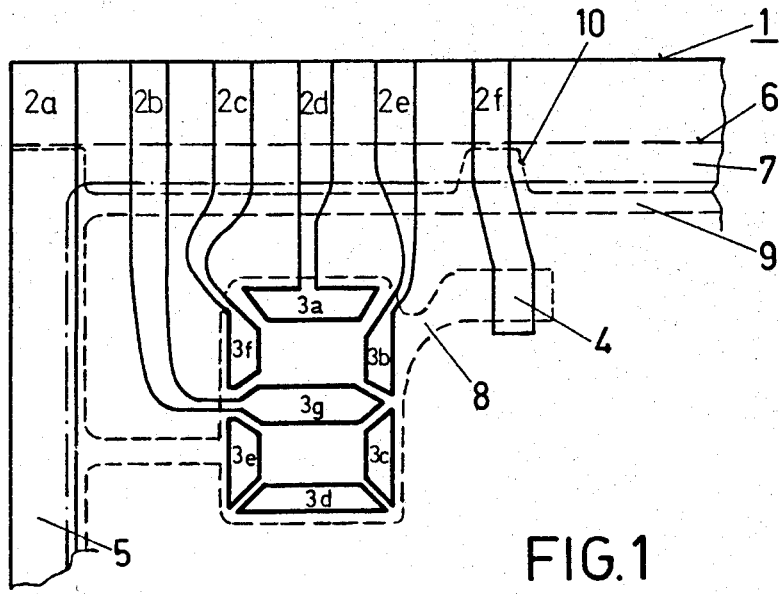
FIG. 1 is a view of a simplified liquid crystal display construction wherein the bridge contact is realized by means of a cell sealing bar with directional conductivity and an electrical connection path having an overlap zone with the sealing bar in the plane of the common electrode.

Referring now to the drawings, wherein like reference numerals designate identical or corresponding parts throughout the several views, and more particularly to FIG. 1 thereof, there is shown on the glass plate 1 a first electrode pattern generally labelled as 4 comprising amongst other things the contacts $2a, 2b, \ldots 2f$, and the digit segments $3a, 3b, \ldots 3g$. Zone 5 is intended for making electrical connection to the second electrode plane. The second electrode is located on the second glass plate 6 and comprises amongst other things the parts 8 and 9. The two electrode plates 1 and 6 are separated from one another by a cell sealing bar 7. The electrode organization differs from conventional technology by the path 9, parallel to the sealing bar 7, of the second electrode which in the area 5 is connected through a lead-in to the contact $2a$ of the first electrode. Now if, in certain applications, the symbol 4, for example, is not being used the path 9 is widened into a zone 10 in the area of overlap of the sealing bar 7 and the connection path $2f$.

It is now possible, without altering the electrodes pattern, to obtain two different displays. If a normal cell seal without any appreciable electrical conductivity is employed then all the display segments can be triggered individually without restriction. On the other hand if a sealing material with unidirectional conductivity is used in accordance with DT-PA 26 10 593.1 (non-metallic curable or solderable binder with admixed metal parts, the maximum expansion of which corresponds at least approximately to the distance between the opposite conductor paths), then an electrical connection is established between the path 2f and the zone 10. As a result the connection 2f and the connection 2a are connected by means of a bridge contact. Symbol 4 is not displayed, therefore, although contact 2f is not contacted from the outside. The slight lateral conductivity of the sealing bar according to the above-mentioned patent application gives rise to no difficulties between neighboring contacts 2 in the first electrode plane. In the case of the normally operable segments 3a, 3b, . . . 3g there are points of overlap with path 9 of the second electrode within the display field but yet they are located outside the sealing bar. Thus the existing conductivity of the sealing bar perpendicular to the electrodes is not effective here. Since the overlap points which were mentioned occur in the region of the liquid crystal layer, the intersection regions appear simultaneously with the corresponding display segments. For this reason the path must only be narrow (approximately 0.2 mm) and must run along the sealing bar outside the visual field. Alternatively the path 9 may be taken outside along the longitudinal edges of the glass plate 6 and the sealing bar 7 may be moved inwards by the width of the path 9.

Figure 2:
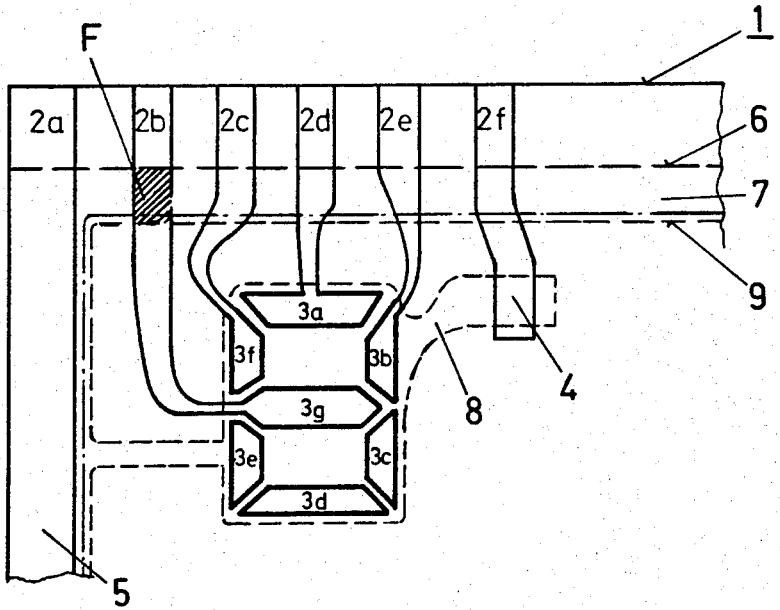
FIG. 2 is a view of a liquid crystal display construction, wherein the connection path of the common electrode is disposed along the glass edges in the region of the sealing bar on the surface of the smaller glass of the liquid crystal (FK) cell facing the liquid crystal layer and the particular conductivity of the sealing bar is carefully selected.

FIG. 2 shows another embodiment which is based on the principle of the invention. In this case the connection path 9 of the second electrode 8 runs along the glass edges in the region of the sealing bar 7 on the surface of the smaller glass plate 6 of the liquid crystal cell facing the liquid crystal layer. Thus in the normal situation the connection path runs below the sealing bar 7. With this technique the sealing bar must have a controlled, low conductivity. In view of the fact that spurious triggering of electrode segments 3 is due to residual conductivity between the electrode paths of the same plane (partly through traces of the electrode layer which have become largely etched away, partly through the liquid crystal substance), in the embodiment shown in FIG. 2, the conductivity of the sealing bar is selected as being sufficiently high to maintain those electrode segments 3 not contacted from the outside at the potential of connection 2a, which is contacted from the outside, through the integrated bridge contact formed by the sealing bar 7 and the path 9. Furthermore, the conductivity of the sealing bar 7 is nevertheless selected sufficiently low as to maintain electrical isolation between those electrode segments 3 which are selected from the outside.

In the embodiment of FIG. 2 the potential difference between the triggered segments of the first electrode and path 9 of the second electrode leads to a current which is drawn additionally from the battery. For this reason, with a distance between the glass plates of approximately 0.01 mm and an overlap area F of the electrode connections (e.g. 2b, FIG. 2) with the sealing bar of approximately F=0.5 mm², the sealing bar should have a resistance of approximately 1 GΩ. This can be achieved according to this invention by replacing the metallically conducting particles otherwise mixed into the sealing bar material with similarly shaped semi-conducting particles. However, in the embodiment of FIG. 2, the semi-conducting particles need not be imbricate (as in DT-PA 26 10 593.1) since the low conductivity may be of equal magnitude in all directions. Typical dimensions for the cell geometry are:

Height of sealing bar: 0.01 mm
Width of sealing bar: 0.3 to 1.5 mm; typically 0.5 mm Minimal distance between contact paths of the first electrode in the region of the sealing bar: 0.3 mm
Width of the contact paths in the region of the sealing bar: 0.3 to 1.5 mm; typically 1.0 mm.

If an overlap area of the two electrodes of 1.0 mm×0.5 mm is taken as typical, then with the data given above a ratio of 3000:1 is obtained for the resistance between neighboring electrode paths of the first plane and that between overlapping areas of electrodes situated opposite one another. The electrical loading through the low conductivity, according to the invention, of the sealing bar between adjacent electrode segments 3 can be ignored.

Small amounts of oxide of indium, tin or zinc as well as carbon dust can give the sealing bar the desired conductivity. The doping material is also chosen in relation to the sealing material. Thus, for example, it was established that in the frequently employed glass soldering technique indium diffuses into the sealing bar from the electrode layer in the high-temperature soldering process and results in limited conductivity. In the case of a plastics sealing material, on the other hand, carbon dust is more suitable as the doping agent.

Figure 3:
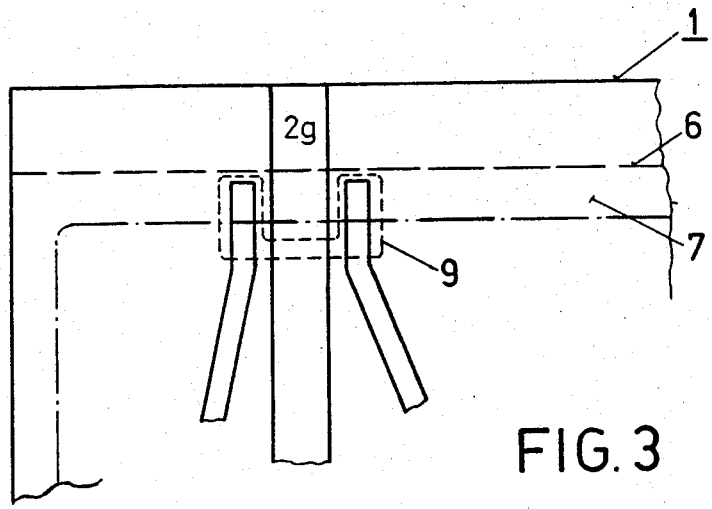
FIG. 3 is an example of a possible utilization of the teachings of the invention wherein a connection between two front electrodes is made in the manner demonstrated in FIG. 1.

The above-described technique of producing bridge contacts according to FIG. 1 is not only applicable to the linking of unused contacts with the connection to the "common" electrode. It is also possible to connect electrically electrode paths which are not neighboring by the same technique. This is shown in FIG. 3.

Figure 4A:
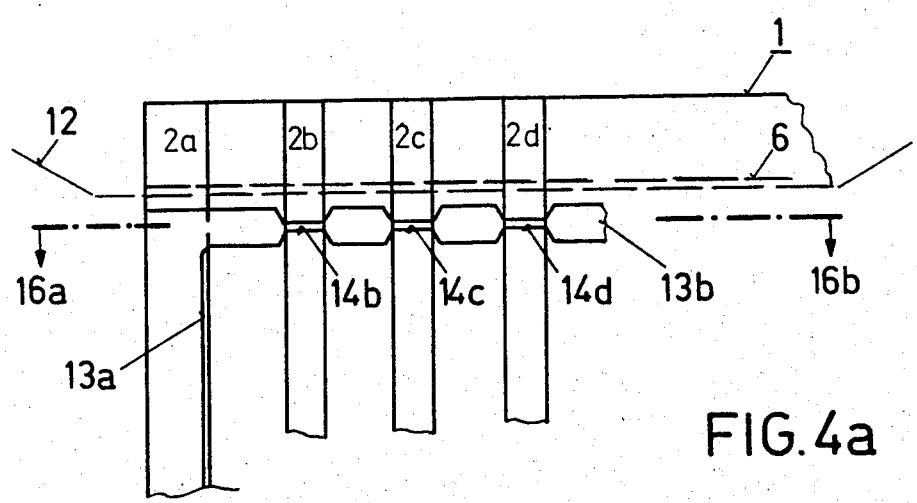
FIG. 4 is a view of another variation of the general conception of the invention wherein unused contact paths are capacitively coupled to the common electrode.
Figure 4B:
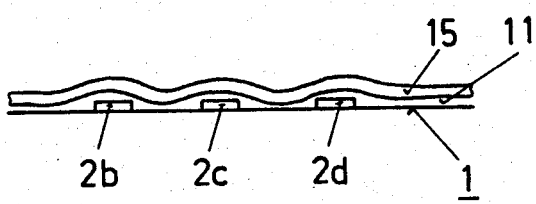

Another technique is based on capacitive coupling of the non-used contact paths and the "common" electrode. This technique functions even with an insulating sealing bar. Because at present the usual liquid crystal displays are operated with alternating current to obtain a long life, free electrode paths can be coupled with the "common" electrode by way of an additionally installed capacitance. This can be explained by reference to FIGS. 4a and 4b. FIG. 4b showing a section normal to the plane of the figure in the line 16a . . . 16b of FIG. 4a. As shown in FIG. 4b the first electrode (2a, 2b, 2c, 2d) is partially covered with a vapour-deposited insulating layer 11 (approximately 500 Å to 3000 Å) of, for example, silicon oxide. The area of the outside contacts (2a, . . . 2d) is covered over by the evaporation mask 12. In many liquid crystal displays this operation is carried out in any case, in order to obtain an electrochemical protective layer. Subsequently, by means of an evaporation mask, the area 13a and 13b is vapour-coated with a layer series 15 consisting of chromium (approximately 100 Å) and aluminum (approximately 1000 Å). Area 13a covers the "common" electrode 2a (approximately 1 mm wide) to a large extent and passes over into the area 13b which preferably runs under the sealing bar which is applied subsequently. The narrow points 14 of 13b are of such dimensions that the electrical capacitance between them and the intersecting electrode paths 2b, 2c, 2d corresponds substantially to that of the corresponding triggerable segments. The disadvantage of this technique is the relatively high additional electric load if all the segments are used.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a liquid crystal display for displaying plural display characters, said display having front and rear glass plates separated by a cell sealing bar, with a liquid crystal layer provided between said plates and retained therebetween by said sealing bar to form a liquid crystal cell, the rear cell plate having a plurality of common electrodes formed thereon, each common electrode corresponding to a respective display character, the front cell plate having plural display electrode segments formed thereon corresponding to respective display characters, said front cell plate having plural contact points for making electrical connection to respective display segments and a contact point for making electrical connection to said common electrodes on said rear cell plate by means of a plate interconnection formed in a predetermined portion of said cell, wherein for a particular application selected of said contact points are to be interconnected, the improvement comprising:

said rear cell plate having formed thereon a conductive bridge connection path having portions thereof overlapped by the orthogonal projection of said selected contact points on said rear cell plate;

said sealing bar contacting all said contact points and disposed between at least said overlapped portions of said bridge connection path on the rear cell plate and said selected contact points on said front cell plate;

said cell sealing bar having a selected unidirectional conductivity presenting high conductivity in a direction perpendicular to said cell plates and low lateral conductivity in a direction parallel to said plates;

said sealing bar contacting the overlapped portions of the selected front cell plate contact points and said bridge connection path such that said selected contact points are electrically interconnected through said sealing bar and said bridge connection path.

2. In a liquid crystal display for displaying plural display characters, said display having front and rear glass plates separated by a cell sealing bar, with a liquid crystal layer provided between said plates and retained therebetween by said sealing bar to form a liquid crystal cell, the rear cell plate having a plurality of common electrodes formed thereon, each common electrode corresponding to a respective display character, the front cell plate having plural display electrode segments formed thereon corresponding to respective display characters, said front cell plate having plural contact points for making electrical connection to respective display segments and a contact point for making electrical connection to said common electrodes on said rear cell plate by means of a plate interconnection formed in a predetermined portion of said cell, wherein for a particular application selected of said segments are unused, the improvement comprising:

said rear cell plate having formed thereon a bridge connection path connected to said common electrodes;

said sealing bar having a selected predetermined conductivity and contacting the front cell plate contact points of respective unused electrode segments and said bridge connection path such that said unused display electrode segments are electrically connected to said common electrode contact point through said sealing bar and said bridge connection path;

said selected predetermined conductivity of said sealing bar being unidirectional to present high conductivity in a direction perpendicular to said cell plates, and low lateral conductivity in a direction parallel to said plates;

said connection path disposed adjacent said sealing bar except for selected portions of said path which are located between the orthogonal projection on said rear cell plate of the contact points of the unused electrode segments and said common electrode contact point, said selected portions of said bridge connection path being overlapped by said sealing bar;

whereby the contact points of the unused electrode segments and the common electrode contact point are interconnected through said sealing bar and said bridge connection path.

3. A liquid crystal display according to claim 2, further comprising:

said cell sealing bar having metal particles admixed with a nonmetallic solderable binder constituting the substance of said sealing bar, said metal particles having a maximum expansion which corresponds at least approximately to the distance between the front and rear cell plates.

4. A liquid crystal display according to claim 2, further comprising:

said cell sealing bar having metal particles admixed with a nonmetallic curable binder constituting the substance of said sealing bar, said metal particles having a maximum expansion which corresponds at least approximately to the distance between front and rear glass plates.

* * * * *